(12) United States Patent
Shu et al.

(10) Patent No.: US 9,256,981 B2
(45) Date of Patent: Feb. 9, 2016

(54) METHOD AND DEVICE FOR PROCESSING GEOLOGICAL INFORMATION

(75) Inventors: Bin Shu, Beijing (CN); Chao Yang, Beijing (CN); Kai Zhang, Beijing (CN); Youjun Wang, Beijing (CN); Yong Wang, Beijing (CN); Zhishan Ren, Beijing (CN); Xinwei Luo, Beijing (CN); Congyun Li, Beijing (CN); Kai Chen, Beijing (CN); Chunhua Jiang, Beijing (CN); Guoyong Li, Beijing (CN); Jinglei Zhou, Beijing (CN); Tong Zhou, Beijing (CN); Xiaopeng Han, Beijing (CN)

(73) Assignees: BEIJING ELECTRIC POWER ECONOMIC RESEARCH INSTITUTE (CN); STATE GRID BEIJING ELECTRIC POWER COMPANY (CN); STATE GRID CORPORATION OF CHINA (CN); BEIJING FOREVER TECHNOLOGY CO., LTD. (CN)

( * ) Notice: Subject to any disclaimer, the term of this patent is extended or adjusted under 35 U.S.C. 154(b) by 0 days.

(21) Appl. No.: 14/117,405

(22) PCT Filed: Jan. 20, 2012

(86) PCT No.: PCT/CN2012/070646
§ 371 (c)(1),
(2), (4) Date: Nov. 13, 2013

(87) PCT Pub. No.: WO2012/155540
PCT Pub. Date: Nov. 22, 2012

(65) Prior Publication Data
US 2014/0233809 A1    Aug. 21, 2014

(30) Foreign Application Priority Data

May 13, 2011 (CN) .......................... 2011 1 0124680
Jul. 19, 2011 (CN) .......................... 2011 1 0201465
Dec. 12, 2011 (CN) .......................... 2011 1 0412529
Dec. 12, 2011 (CN) .......................... 2011 1 0412550

(51) Int. Cl.
*G06T 7/00* (2006.01)
*G06T 17/05* (2011.01)
*G06T 3/40* (2006.01)

(52) U.S. Cl.
CPC ............... *G06T 17/05* (2013.01); *G06T 3/4038* (2013.01); *G06T 7/0028* (2013.01); *G06T 2207/10032* (2013.01); *G06T 2207/30184* (2013.01)

(58) Field of Classification Search
USPC ........................................................ 382/109
See application file for complete search history.

(56) References Cited

U.S. PATENT DOCUMENTS

2007/0014488 A1*  1/2007  Chen et al. .................... 382/294

FOREIGN PATENT DOCUMENTS

CN    101216555 A    7/2008
CN    101887595 A    11/2010
(Continued)

OTHER PUBLICATIONS

International Search Report for corresponding application PCT/CN2012/070646 filed Jan. 20, 2012; Mail date Apr. 12, 2012.

*Primary Examiner* — Utpal Shah
*Assistant Examiner* — Kate R Duffy
(74) *Attorney, Agent, or Firm* — Cantor Colburn LLP

(57) ABSTRACT

A method and a device for processing geological information is disclosed. The method for processing the geological information includes acquiring multiple geological image graphs, determining the relation between the image coordinate and the ground coordinate of each of the multiple geological image graphs by an imaging mode of geological images, and joining the multiple geological image graphs together according to the relation between the image coordinate and the ground coordinate of each of the multiple geological image graphs. Accordingly, large-scale ground images can be acquired by processing the geological images.

16 Claims, 9 Drawing Sheets

(56) References Cited

FOREIGN PATENT DOCUMENTS

| | | |
|---|---|---|
| CN | 102004791 A | 4/2011 |
| CN | 102323096 A | 1/2012 |
| CN | 102324060 A | 1/2012 |
| JP | 2006048489 A | 2/2006 |

* cited by examiner

METHOD AND DEVICE FOR PROCESSING GEOLOGICAL INFORMATION

TECHNICAL FIELD OF THE DISCLOSURE

The present disclosure relates to the field of data processing, and particularly to a method and a device for processing geological information.

BACKGROUND OF THE DISCLOSURE

Geological data is important basis for planning, design, construction, running and transformation of electrical networks, and not only engineering construction cost, but also safety of electrical network construction and running are influenced by geological conditions. Requirements for electric power construction to respond to changes of geological conditions are continually increasing as geological conditions and construction standards change constantly. The construction efficiency of electrical networks is increasingly influenced by the traditional map board pattern and the pattern of separated management of engineering geological data according to projects. Construction of a system for managing geological information for electric facility engineering is needed urgently and processing of geological images is an important part to reflect geological conditions.

Large-scale ground images can be hardly acquired through processing of geological images in the prior art, which causes much inconvenience in acquisition of geological data.

SUMMARY OF THE DISCLOSURE

The main purpose of the present disclosure is to provide a method and a device for processing geological information to solve the problem that large-scale ground images can be hardly acquired by processing of geological images in the prior art.

To realize the purpose above, a method for processing geological information is provided according to an aspect of the present disclosure. The method for processing geological information includes: acquire multiple geological image graphs; determine the relation between the image coordinate and the ground coordinate of each of the multiple geological image graphs by an imaging mode of geological images; and join the multiple geological image graphs together according to the relation between the image coordinate and the ground coordinate of each of the multiple geological image graphs.

Further, acquiring the multiple geological image graphs includes: acquire multiple geological image graphs of different time.

Further, joining the multiple geological image graphs together according to the relation between the image coordinate and the ground coordinate of each of the multiple geological image graphs includes: respectively perform geometric correction for the multiple geological image graphs and join the multiple geometrically-corrected geological image graphs together.

Further, respectively performing the geometric correction for the multiple geological image graphs includes: acquire the coordinates of the multiple geological image graphs respectively and correct the multiple geological image graphs to the same coordinate system according to a data image correction method.

Further, joining the multiple geometrically-corrected geological image graphs together includes: search mosaic borders of the multiple geological image graphs respectively; determine optimal mosaic borders of the multiple geological image graphs, wherein the optimal mosaic borders are lines between the closest brightness on adjacent geological image graphs; and join the multiple geological image graphs together according to the optimal mosaic borders of the multiple geological image graphs.

Further, after searching the mosaic borders of the multiple geological image graphs respectively, the method further includes: smooth the mosaic borders of the multiple geological image graphs respectively; and perform brightness and contrast adjustment for the multiple geological image graphs.

Further, the method for processing geological information further includes: acquire geological vector data in the geological information; acquire image data in the geological information; and perform spatial-location matching for the geological vector data and the image data to acquire geological images.

Further, after performing the spatial-location matching for the geological vector data and the image data to acquire the geological images, the method further includes: stack the vector data and the geological images to acquire remote sensing data.

Further, after stacking the vector data and the geological images to acquire the remote sensing data, the method further includes: correct the geological images, including inclination correction and correction of relief displacement of the geological images.

Further, correcting the geological images includes: use a polynomial transformation geometric model to correct the geological images of flat areas and those failing to provide image satellite orbit parameters and sensor parameters, wherein the difference of squares is calculated by more than two redundant control points.

Further, correcting the geological images includes: perform physical model correction for the geological images of areas with terribly undulate landforms or large image side views and those applying satellite orbit parameters and sensor parameters of imaging.

Further, performing the physical model correction for the geological images includes: recover an imaging model of the geological images; use a Digital Elevation Model (DEM) to correct the relief displacement according to the imaging model; and use three-dimensional map coordinates or field control point three-dimensional coordinates to perform correction control for the geological images to acquire orthorectified geological images.

Further, the method further includes: receive query keywords inputted by a user; and use a search engine algorithm to perform quick retrieval for investigation data based on the keywords.

Further, the method further includes: Step 2: acquire first image data and select a characteristic point group of a first area on a first image; Step 4: correct each characteristic point in the characteristic point group to form a second area; and Step 6: splice the second area at a location corresponding to the first area on a second image.

Further, Step 4 includes: Step 41: calculate the minimum mean square error of each characteristic point; and Step 43: correct each characteristic point according to the minimum mean square error; further the minimum mean square error in Step 41 is calculated according to the following method:

acquire the minimum mean square error of each characteristic point by performing rigid transformation for the base point coordinate of each characteristic point and the minimum mean square error applies the following formula:

$$\min_F E = \min_F \frac{1}{N} \sqrt{\sum_{i=0}^{N} \|y_i - F(x_i)\|^2}$$

where $x_i$ and $y_i$ are the base point coordinates of the characteristic point;

$$\min_F E$$

is the minimum mean square error; $F(x_i)$ is rigid transformation, i.e. the distance between any two points in an image is unchanged before and after the transformation, or, a calculation method of the minimum mean square error in Step 41 is: acquire the minimum mean square error of each characteristic point by performing rotation transformation for the base point coordinate of each characteristic point, and the minimum mean square error applies the following formula:

$$\min_F E = \frac{1}{N} \sum_{i=0}^{N} \|y_i - R(x_i) - T\|^2$$

where $x_i$ and $y_i$ are the base point coordinates of the characteristic point;

$$\min_F E$$

is the minimum mean square error; $R(x_i)$ is rotation transformation, i.e. each point P is enabled to rotate around a fixed point with a fixed angle to become another point P', the transformation caused thereby is called rotation transformation on a plane; T is translation transformation, i.e. the translation amount between images along the x and y directions.

Further, a method for splicing the second area to the second image in Step 6 includes: project the second area at the location corresponding to the first area on the second image; or superpose the second area at the location corresponding to the first area on the second image.

To realize the purpose above, a device for processing geological information is provided according to another aspect of the present disclosure. The device for processing geological information includes an acquiring unit, configured to acquire multiple geological image graphs; a determining unit, configured to determine the relation between the image coordinate and the ground coordinate of each of the multiple geological image graphs by an imaging mode of geological images; and a synthesizing unit configured to join the multiple geological image graphs together according to the relation between the image coordinate and the ground coordinate of each of the multiple geological image graphs.

Further, the synthesizing unit includes: a correcting module, configured to respectively perform geometric correction for the multiple geological image graphs; and a synthesizing module configured to join the multiple geometrically-corrected geological image graphs together.

Further, the correcting module includes: an acquiring sub-module, configured to acquire the coordinates of the multiple geological image graphs respectively; and a correcting sub-module, configured to correct the multiple geological image graphs to the same coordinate system according to a data image correction method.

Further, the synthesizing module includes: a searching sub-module, configured to search mosaic borders of the multiple geological image graphs respectively; a determining sub-module, configured to determine optimal mosaic borders of the multiple geological image graphs, wherein the optimal mosaic borders are lines between the closest brightness on adjacent geological image graphs; and a synthesizing sub-module, configured to join the multiple geological image graphs together according to the optimal mosaic borders of the multiple geological image graphs.

Further, the method further includes: acquire geological data distributed on an electrical network at a preset area and engineering data designed in power engineering at the preset area; perform spatial-location superposition for the coordinates of the geological data and the coordinates of the engineering data to acquire a multidimensional space-time electric power engineering geological information model; and acquire multidimensional space-time electric power engineering geological information by transferring design parameters in the multidimensional space-time electric power engineering geological information model.

Further, acquiring the geological data distributed on the electrical network at the preset area and the engineering data designed in the power engineering at the preset area includes: according to spatial locations distributed on the electrical network, acquire topographic, geomorphic and geological space data distributed on the electrical network.

Further, acquiring the geological data distributed on the electrical network at the preset area and the engineering data designed in the power engineering at the preset area further includes: use electric power engineering design as an object and respectively acquire the time of planning, implementation, running and transformation designed in the electric power engineering.

Further, after performing the spatial-location superposition for the coordinates of the geological data and the coordinates of the engineering data to acquire the multidimensional space-time electric power engineering geological information model, the method for acquiring the electric power engineering geological information further includes: according to changes of the geological data and the engineering data, modify the multidimensional space-time electric power engineering geological information model dynamically.

Through the present disclosure, multiple geological image graphs are acquired; the relation between the image coordinate and the ground coordinate of each of the multiple geological image graphs is determined by an imaging mode of geological images; and the multiple geological image graphs are joined together according to the relation between the image coordinate and the ground coordinate of each of the multiple geological image graphs. Therefore, the problem that large-scale ground images can be hardly acquired by processing of geological images in the prior art is solved to further realize the effect of obtaining the large-scale ground images by processing the geological images.

BRIEF DESCRIPTION OF THE DRAWINGS

The accompanying drawings, which constitute a part of the present application, are used for providing further understanding to the present disclosure. The exemplary embodiments of the present disclosure and the illustrations thereof are used for explaining the present disclosure, instead of constituting an improper limitation to the present disclosure. In the accompanying drawings.

DETAILED DESCRIPTION OF THE DISCLOSURE

It should be noted that, if there is no conflict, the embodiments in the present application and the characteristics in the embodiments can be combined with one another. The present disclosure will be described in details below with reference to the accompanying drawings and in combination with the embodiments.

Figure 1:
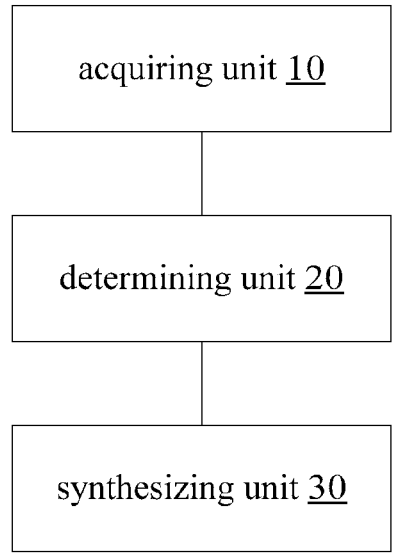
FIG. 1 is a schematic diagram of a device for processing geological information according to the first embodiment of the present disclosure.

FIG. 1 is a schematic diagram of a device for processing geological information according to the first embodiment of the present disclosure.

As shown in FIG. 1, the device for processing geological information includes an acquiring unit 10, a determining unit 20 and a synthesizing unit 30.

The acquiring unit 10 is configured to acquire multiple geological image graphs.

The determining unit 20 is configured to determine the relation between the image coordinate and the ground coordinate of each of the multiple geological image graphs by an imaging mode of geological images.

The synthesizing unit 30 is configured to join the multiple geological image graphs together according to the relation between the image coordinate and the ground coordinate of each of the multiple geological image graphs.

In the device for processing geological information, the acquiring unit 10 acquires the multiple geological image graphs, the determining unit 20 determines the relation between the image coordinate and the ground coordinate of each of the multiple geological image graphs by the imaging mode of the geological images, and the synthesizing unit 30 joins the multiple geological image graphs together according to the relation between the image coordinate and the ground coordinate of each of the multiple geological image graphs, thereby solving the problem that large-scale ground images can be hardly acquired by processing of geological images in the prior art to further realize the effect of obtaining the large-scale ground images by processing the geological images.

Figure 2:
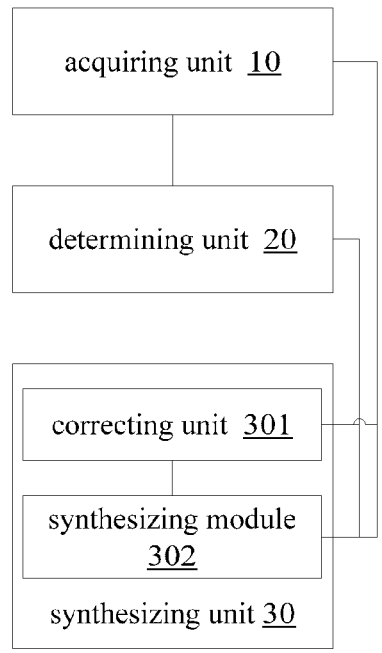
FIG. 2 is a schematic diagram of a device for processing geological information according to the first preferred embodiment of the present disclosure.

FIG. 2 is a schematic diagram of a device for processing geological information according to the first preferred embodiment of the present disclosure.

As shown in FIG. 2, the device for processing geological information includes an acquiring unit 10, a determining unit 20 and a synthesizing unit 30, wherein the synthesizing unit 30 includes a correcting module 301 and a synthesizing module 302.

Functions of the acquiring unit 10 and the determining unit 20 are the same as those in the embodiment above.

The correcting unit 301 is configured to respectively perform geometric correction for the multiple geological image graphs.

Digital image correction: determine a mathematical model between the image coordinates and the ground coordinates according to the imaging mode of the geological images; determine a correction formula according to an applied digital model; perform adjustment calculation according to ground control points and corresponding image point coordinates to transform parameters and evaluate precision, simultaneously perform geometric transformation calculation for original images, and resample pixel brightness values.

The synthesizing module 302 is configured to join the multiple geometrically-corrected geological image graphs together.

Figure 3:
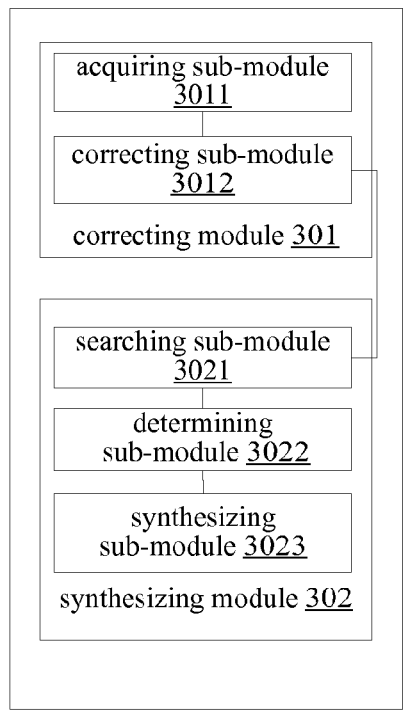
FIG. 3 is a schematic diagram of a synthesizing unit in a device for processing geological information according to an embodiment of the present disclosure.

FIG. 3 is a schematic diagram of a synthesizing unit in a device for processing geological information according to an embodiment of the present disclosure.

As shown in FIG. 3, as a first preferred embodiment of the present embodiment, the device for processing geological information includes an acquiring unit 10, a determining unit 20 and a synthesizing unit 30, wherein the synthesizing unit 30 includes a correcting module 301 and a synthesizing module 302, and the correcting module 301 includes an acquiring sub-module 3011 and a correcting sub-module 3012.

The acquiring sub-module 3011 is configured to acquire the coordinates of the multiple geological image graphs respectively.

The correcting sub-module 3012 is configured to correct the multiple geological image graphs to the same coordinate system according to a data image correction method.

As a second preferred embodiment of the present embodiment, the synthesizing module 302 includes a searching sub-module 3021, a determining sub-module 3022 and a synthesizing sub-module 3023.

The searching sub-module 3021 is configured to search mosaic borders of the multiple geological image graphs respectively.

The determining sub-module 3022 is configured to determine optimal mosaic borders of the multiple geological image graphs, wherein the optimal mosaic borders are lines between the closest brightness on adjacent geological image graphs.

The synthesizing sub-module 3023 is configured to join the multiple geological image graphs together according to the optimal mosaic borders of the multiple geological image graphs.

Digital image mosaic: image mosaic refers to combining different image files to form a complete image containing interested areas. Large-scale ground images can be acquired through mosaic processing. The mosaic images may be from different time, but should be overlapped to a certain degree.

Keys to digital image mosaic: since geometric deformations of various geological image data are different, all mosaic images are corrected to a unified coordinate system according to a data image precise correction method in order to splice multiple data images, and the splicing is geometric correction in essence. After removing overlapped parts, multiple images are spliced to form a larger image. The second key is a method for ensuring that the spliced images have consistent contrasts and similar hues without obvious seams. A geometric correction process is described as follows:

Geometric correction of images: search mosaic borders; use ½ of an image overlapped area as a mosaic border; and then search an optimal mosaic border, i.e. the line between the closest brightness values on a left image and a right image.

Adjustment of brightness and contrast: smooth a boundary; the hues and contrasts of the two images are close through the adjustment above. However, there is still a seam and the boundary has to be smoothed.

Figure 4:
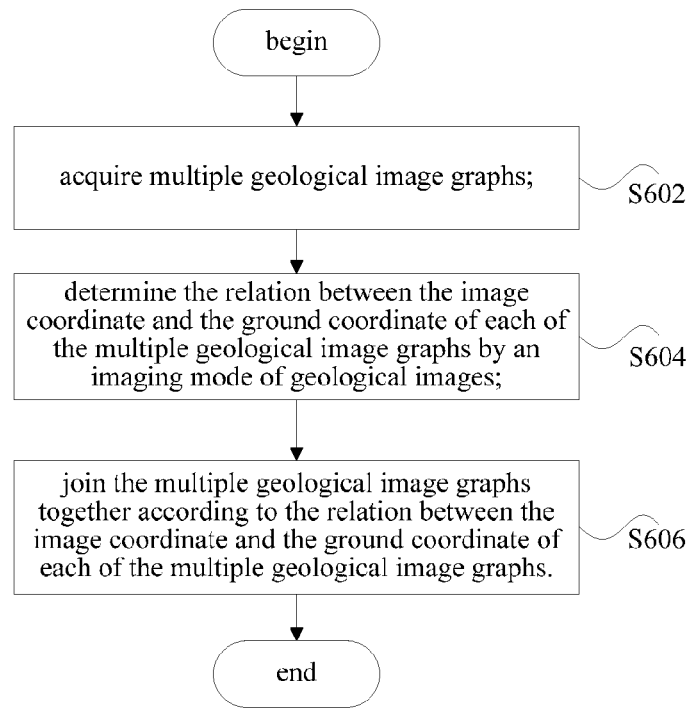
FIG. 4 is a flowchart of a method for processing geological information according to the first embodiment of the present disclosure.

FIG. 4 is a flowchart of a method for processing geological information according to the first embodiment of the present disclosure.

As shown in FIG. 4, the method for processing geological information includes:

Step 602: acquire multiple geological image graphs;

Step 604: determine the relation between the image coordinate and the ground coordinate of each of the multiple geological image graphs by an imaging mode of geological images; and Step 606: join the multiple geological image graphs together according to the relation between the image coordinate and the ground coordinate of each of the multiple geological image graphs.

Preferably, acquiring the multiple geological image graphs includes: acquire multiple geological image graphs of different time.

Preferably, joining the multiple geological image graphs together according to the relation between the image coordinate and the ground coordinate of each of the multiple geological image graphs includes: respectively perform geometric correction for the multiple geological image graphs and join the multiple geometrically-corrected geological image graphs together.

Preferably, respectively performing the geometric correction for the multiple geological image graphs includes: acquire the coordinates of the multiple geological image graphs respectively and correct the multiple geological image graphs to the same coordinate system according to a data image correction method.

Preferably, joining the multiple geometrically-corrected geological image graphs together includes: search mosaic borders of the multiple geological image graphs respectively; determine optimal mosaic borders of the multiple geological image graphs, wherein the optimal mosaic borders are lines between the closest brightness on adjacent geological image graphs; and join the multiple geological image graphs together according to the optimal mosaic borders of the multiple geological image graphs.

Preferably, after searching the mosaic borders of the multiple geological image graphs respectively, the method further includes: smooth the mosaic borders of the multiple geological image graphs respectively; and perform brightness and contrast adjustment for the multiple geological image graphs.

In order to enhance scientific management of electrical network planning and design, an embodiment of the present disclosure creatively puts forward a "multidimensional space-time electric power engineering geological information model". An "electrical network, geomorphology, geology and time" multidimensional information structure is configured to comprehensively express an electrical network construction geological environment, integrate data including topographic image graphs of the electrical network and ground spaces as well as various underground isograms and structural diagrams and the like according to geographical spatial locations, and couple the data according to design data of each key time node (selection of locations and routes, planning design and construction running) of electric power facilities including substations, overhead lines and cable tunnels etc. to form an original multidimensional space-time electric power facility engineering geological information model to support life cycle management of geological information of electric power facility engineering.

Taking the Beijing Geology Map for example, a "multidimensional space-time electric power engineering geological information model" is constructed based on spatial locations, a large map system including the Beijing Geology Map etc. is scanned according to different partitions by a "method for splicing characteristic point correction partitions", existing coordinates of multiple related electric power projects are selected as a characteristic point group to project corresponding scanning maps in a Beijing electric power geographical information space according to different partitions and layers to improve the superposition precision of raster graphs and geographic spaces. Electrical network distribution is correlated with corresponding geomorphologic and geological space data, and geological and electric power engineering information is managed dynamically using electric power engineering design as an object and planning, preliminary design, installation, running and transformation as time nodes.

Supported by Geographic Information System (GIS) technology, based on acquisition, organization, analysis and integration of existing data, information and achievements, and guided by demands of electrical network planning design services, the present project aims to manage geological information digitally and integrally, and construct a specialized electric power geological information management system by comprehensively using GIS technology, computer network technologies, modern database technologies and system integration technologies. The subject is mainly devoted to integration and secondary development of data and achievements, which is described throughout the whole process of the work based on the principle of "implementing construction, application, services and improvement simultaneously".

1 System Platform Construction 1.1 System Design Principles

The system is designed according to technical principles of advancement, foresight, specialization and openness.

In the aspect of advancement, the product is development by using the most advanced and mature platform at present. The GIS platform applies the ArcGIS platform of American company Environmental Systems Research Institute, Inc. (ESRI), and has been comprehensively fitted to the most mature Version 9.2. ORACLE10G is applied as the database and the system is designed by using a Client/Server (C/S) three-layer architecture.

In the aspect of foresight, the product is designed by learning from successful experience of geographical information system construction in the electric power industry and sufficient design reservations are prepared to keep up with the tendency of construction of electrical network planning and design information systems in the future.

In the aspect of specialization, according to actual characteristics of requirements of electrical network planning and design on geology, geological data characteristic points are analyzed, and related service models are abstracted to provide applications including query and management of geological data, and production and output of various geological thematic maps etc.

In the aspect of openness, the product provides a standard data and function integration interface integrated with other systems including a graphics and archives management system and a production management system etc.

1.2 System Architecture Design

Figure 6:
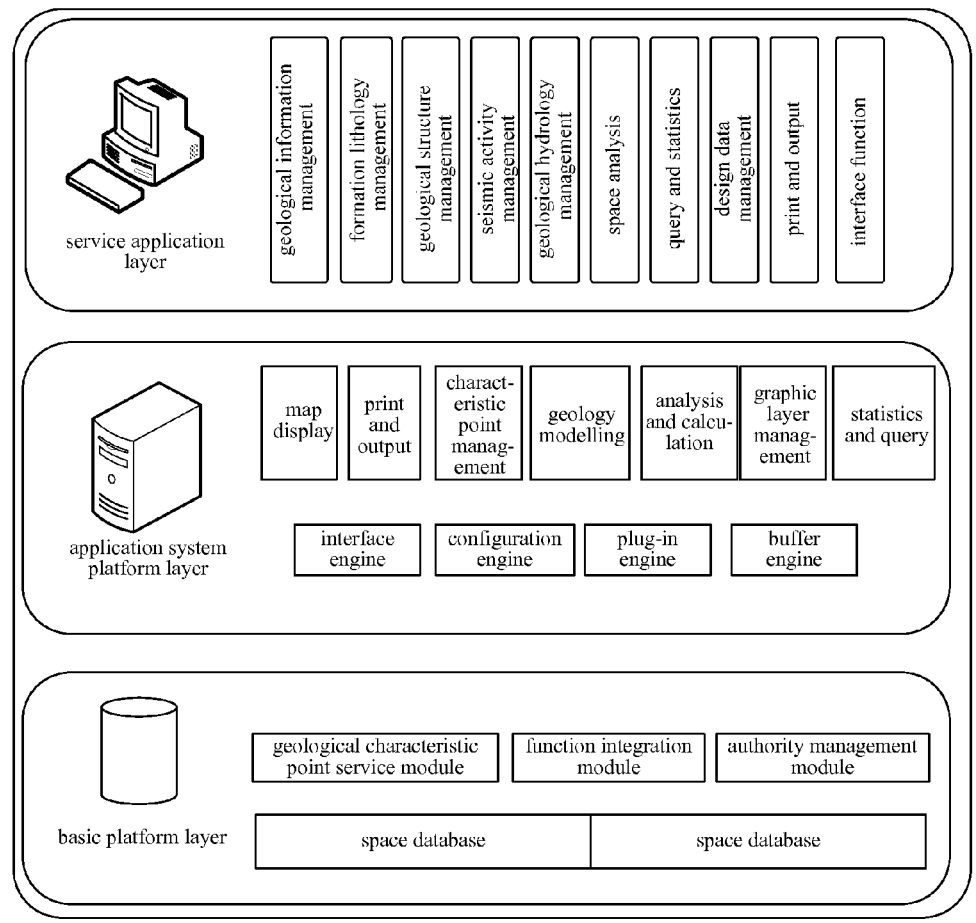
FIG. 6 is a schematic block diagram of a system for processing a geological image according to an embodiment of the present disclosure.

As shown in FIG. 6, the system generally applies a three-layer architecture system, including a service application layer, an application system platform layer and a basic platform layer.

The basic platform layer includes: an attribute database which contains and stores geological information, a GIS database which stores graphic information and a geological digital model library constructed according to basic data.

The application system platform layer includes: application service components configured to manage data models and provide services for the service application layer, e.g. a map display component, a printing and output component, and a geological modelling component etc.

The service application layer includes: various service functional applications, e.g. management, query and statistics, analysis and calculation of various geological information, and data interfaces with other information systems.

1.3 System Security Design 1.3.1 Data Structure Security Design

The system follows the overall prevention and protection strategy of network and information security according to different partitions, regions, and grades of the State Grid to develop various data structures in the system and corresponding security design including storage, application and sharing etc. according to data security requirements of the company.

1.3.2 System Access Security Design

Under the C/S application mode, a data security structure with multilayer and multilevel information encryption is configured in the GIS system based on an in/out information management method of personal usernames and passwords in combination with a database internal security mechanism.

1.3.3 Authority Control Design

The system solves the problem of security management in a Wide Area Network (WAN) by using a security management function combined with organization management, a username/password-based identity authentication mode and a role-based access control mechanism, and the basic security management principle is: delimitating posts according to responsibilities and fixing personnel according to posts to construct a security management mechanism based on the Lightweight Directory Access Protocol (LDAP) and integrate system authority management with security management of overall company information.

Figure 7:
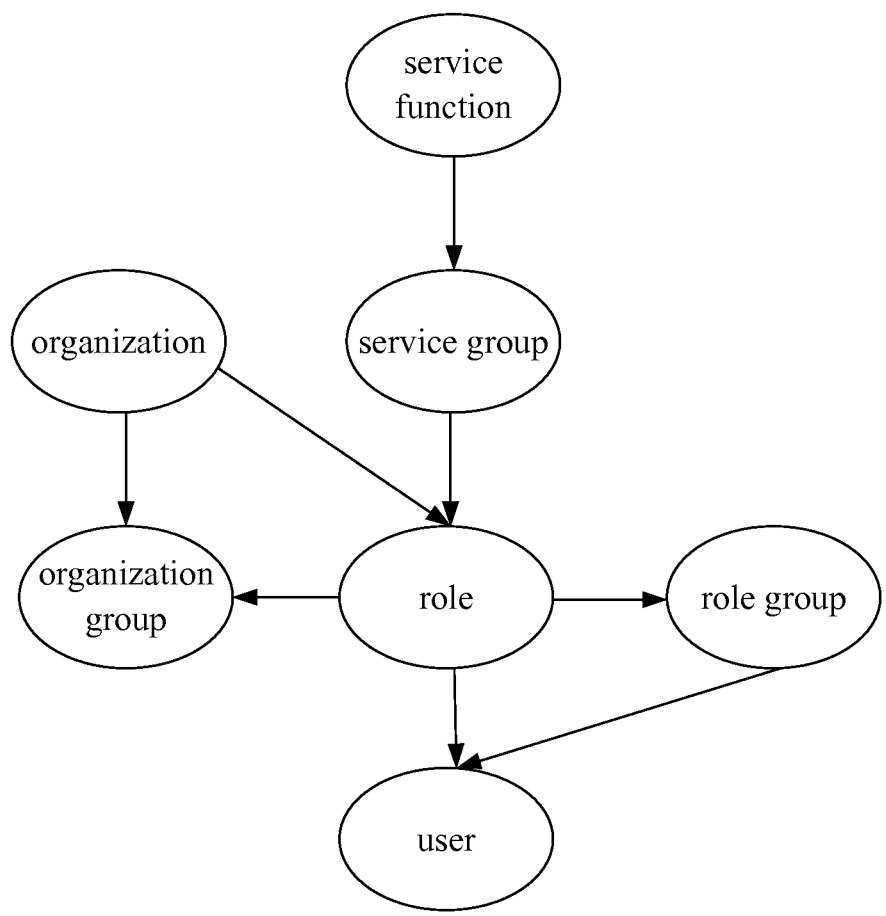
FIG. 7 is a schematic diagram of an authority management model according to an embodiment of the present disclosure.

A specific authority management model is as shown in FIG. 7.

2.3.4 Log Management and Design

A system data management log, in which operation information including user login, data access and editing etc., is created automatically during normal running of the system, and the system data management log may be checked to help track operations of logged-in users.

1.4 System Function Design 1.4.1 Space Analysis

Buffer area analysis: the system is able to analyze geological conditions within a given radius at the position where a project locates, and provides circular, rectangular and polygonal selection tools. These tools may be dragged on a map to select a range, in which information corresponding to an object on the map will be displayed. At the same time, statistics and query may be further performed by applying a buffer area.

Isosurface analysis: a geological condition isosurface required by a service application is formed by the system automatically according to information including geological conditions, related parameters and critical values etc. to assist station and location selection of design planning.

1.4.2 Information Retrieval and Browsing

The system is developed and designed according to actual engineering demands to implement a full-sequence multifunctional and digital retrieval and browsing function for geological information.

The system enables fuzzy retrieval based on keywords of geological characteristic points, as well as retrieval manners including precise coordinate (longitude and latitude) location and retrieval of buffer area distance etc., and provides combined retrieval according to various conditions. At the same time, the system may be linked with tens of engineering sequences to perform query, which greatly facilitates applications of actual projects and scientific researches.

1.4.3 Graph Printing and Output

The system provides a convenient graph printing function, which allows printing and output of a single graph or multiple graphs in a selected range according to conditions of paper sheets and proportions etc.

At the same time, the system is able to digitally output data in various geological thematic maps. Coordinate information and data content should be correct, and graphic layers should be divided clearly during the output. The system supports output of formats including Auto-Computer-Aided Design (AutoCAD), Shapefile (SHP) and picture formats etc.

2. Data Acquisition and Organization 2.1 Data Acquisition

Existing engineering geological data is acquired comprehensively, summed up, organized, analyzed and summarized to form a set of system background data to serve the project.

2.1.1 Regional Basic Geological Data

Basic geological data acquired by the project covers various related fields including basic geology, engineering geology, seismic geology and hydrological geology etc., mainly including the following content:

Regional Geological Record of Beijing
Beijing Tectonic System Map
Beijing Activity Structure Map
Beijing Geology Map
Beijing Hydrological Geology Map
Assessment Scope Map of Geological Disasters of Construction Land in Plain Areas of Beijing
Distribution Map of Ancient Stream Channels in Plain Areas of Beijing
Beijing Earthquake Liquefaction Zone Map
Isopach Map of Quaternary Overburden Layer in Plain Areas of Beijing
Zone Map of Design Basic Acceleration of Ground Motion in Beijing etc.

2.1.2 Engineering Investigation Data

Ever since the early 1990s, Beijing has witnessed a development peak, during which a large number of civil buildings, public buildings and public facilities have been constructed and a large amount of geotechnical engineering investigation, geotechnical engineering construction, risk evaluation of geological disasters and geological environment evaluation etc. has been carried out. Data is acquired in a three-dimensional manner, including single-hole data, and related achievement reports etc., mainly including project investigation reports of electric power engineering, civil buildings, public buildings, urban subways, and roads and bridges etc. as well as risk evaluation reports of geological disasters, and the like. Data requirements of the project can be basically satisfied through all-around data acquisition.

3.2 Data Integration and Organization 3.2.1 Integration of Regional Basic Geological Map System The project needs to overcome digital barriers between industries and enterprises, use published information to enrich electric power engineering geological information and data, and scan large-scale drawings to satisfy the precision required by preliminary stages of the project. Since the precision of drawings is affected by the precision of printing devices, archive storage methods, humidity and temperature of scanning sites, and precision of scanning devices, larger graphs will have greater precision deviation. In order to improve the precision and satisfy basic requirements of preliminary work, the project creatively applies a "method for splicing characteristic point correction partitions" for the first time to scan a large map system including the "Beijing Geology Map" etc. according to different partitions and projects a corresponding scanning map in the Beijing electric power geographical information space according to different partitions and layers to improve the superposition precision of raster graphs of geological focus area of electric power engineering and geographic spaces to form a basic geological map system module. The system performs spatial-location matching for geological vector data with image data to implement superposition management of geological data and geographic space vector data, thereby more effectively utilizing comprehensive geological information in combination with electrical networks and geographic vectors. At the same time, landforms can be reflected by remote sensing images more visually to satisfy requirements of the preliminary stages of the project. A large map system, including the "Beijing Geology Map" etc., is scanned according to different partitions for the first time, and existing coordinates of multiple related electric power projects are selected as a characteristic point group to project a corresponding scanning map in the Beijing electric power geographical information space according to different partitions and layers.

3.2.2 Engineering Investigation Data Organization

Data of the work is analyzed and organized from the following 5 aspects, and stacked with GIS background data to form an investigation project data module.

Basic information: names of source data, coordinates (longitude and latitude), construction locations, depths of holes, underground water depths etc.

Layered information: stratum genesis, stratum description, depths of stratum and ground bearing capacity;

Seismic design conditions: basic parameters of seismic effect, field types and earthquake liquefaction;

Soil test data;

In-situ test data etc.

Figure 8:
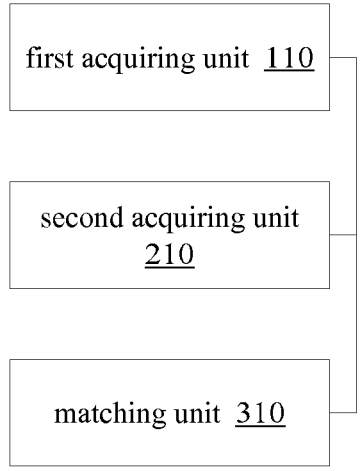
FIG. 8 is a schematic diagram of a device for processing geological information according to the second embodiment of the present disclosure.

FIG. 8 is a schematic diagram of a device for processing geological information according to the second embodiment of the present disclosure. The characteristics in the present embodiment may be combined with those in the first embodiment.

As shown in FIG. 8, the device for processing geological information includes a first acquiring unit 110, a second acquiring unit 210 and a matching unit 310.

The first acquiring unit 110 is configured to acquire geological vector data in the geological information.

The second acquiring unit 210 is configured to acquire image data in the geological information.

The matching unit 310 is configured to perform spatial-location matching for the geological vector data and the image data to acquire geological images.

In the device for processing geological information, the first acquiring unit 110 acquires the geological vector data in the geological information, the second acquiring unit acquires the image data in the geological information and the matching unit 310 performs the spatial-location matching for the geological vector data and the image data to acquire the geological images, thereby solving the problem that space conditions can be hardly reflected visually due to separate management of geological images and geological vectors, and further realizing the effect of reflecting the space conditions more visually.

The system of the present embodiment may apply the stable ArcGIS platform with powerful functions as a component for secondary development to comprehensively express electric power engineering geological information.

The system performs spatial location matching for the geological vector data and the image data to realize superposition management of remote sensing data and vector data, thereby more effectively checking and utilizing comprehensive geological information in combination with vectors. At the same time, space conditions can be reflected by remote sensing images more visually, which is beneficial for management and analysis of the vector data, thereby further realizing seamless integration and integrated management of geological vectors and images.

The ArcGIS platform may apply the research and development experience of the GIS platform of the American company ESRI. The platform, which comprehensively incorporates mainstream Information Technologies (IT) including Component Object Model (COM) technology, the concept of distributed database, multilayer system structures, fully-open technologies, object-oriented technologies, WEB technologies, and JAVA technologies etc., and follows general international standards, is a set of the entire series of GIS software platforms with a unified, integrated, complete and flexible integrated system structure. The flexible and extensible C/S and Browser/Server (B/S) combined system structure provides a solution which is more perfect and more open with stronger extensibility according to multi-level application demands of users.

The system provides automatic correction of geometric models and physical models for geological image data, and performs inclination correction and correction of relief displacement to geological images to correct geological images having image displacement caused by sensor errors or topographic relief.

The system uses a polynomial transformation geometric model to correct the geological images of flat areas or those failing to provide image satellite orbit parameters and sensor parameters. In practical work, there must be at least more than two redundant control points to calculate the difference of squares and several examination points should be provided.

The system performs strict physical model correction for geological images of areas with terribly undulate landforms or large image side views by utilizing satellite orbit parameters, sensor parameters of imaging and a DEM. During the correction, an imaging model of images is recovered first, and then relief displacement is corrected by the DEM according to the imaging model, and the correction of the images is controlled by existing three-dimensional map coordinates or field control point coordinates to finally acquire orthorectified geological images.

The system realizes rapid and smart search for investigation data, applies an advanced search engine algorithm to perform searching based on retrieval of query keywords inputted by users, and maintains a quick retrieval database locally so that retrieval of users is more intelligent and personalized. On this basis, a higher recall ratio, a higher precision ratio and a more comprehensive retrieval function are realized during data retrieval and investigation users.

Figure 9:
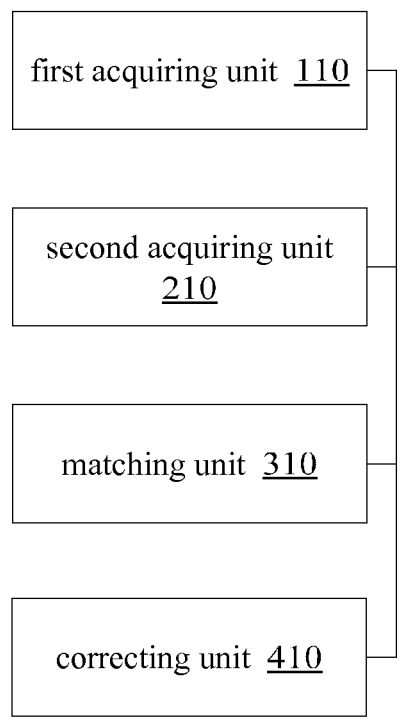
FIG. 9 is a schematic diagram of a device for processing geological information according to the second preferred embodiment of the present disclosure.

FIG. 9 is a schematic diagram of a device for processing geological information according to the second preferred embodiment of the present disclosure.

As shown in FIG. 9, besides the first acquiring unit 110, the second acquiring unit 210 and the matching unit 310, the device for processing geological information further includes a correcting unit 410.

The first acquiring unit 110 is configured to acquire the geological vector data in the geological information.

The second acquiring unit 210 is configured to acquire the image data in the geological information.

The matching unit 310 is configured to perform the spatial-location matching for the geological vector data and the image data to acquire the geological images.

The correcting unit 410 is configured to correct the geological images, including inclination correction and correction of relief displacement of the geological images.

Figure 10:
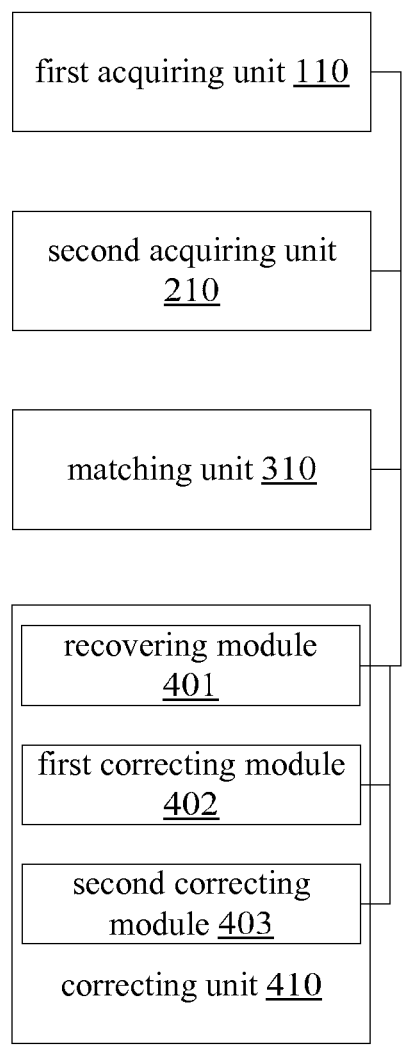
FIG. 10 is a schematic diagram of a device for processing geological information according to the third preferred embodiment of the present disclosure.

FIG. 10 is a schematic diagram of a device for processing geological information according to the third preferred embodiment of the present disclosure.

Preferably, the correcting unit 410 includes: a recovering module 401 configured to recover an imaging model of the geological images; a first correcting module 402 configured to use a DEM to correct the relief displacement according to the imaging model; and a second correcting unit 403 configured to use three-dimensional map coordinates or field control point three-dimensional coordinates to control correction of the geological images to acquire orthorectified geological images.

Figure 11:
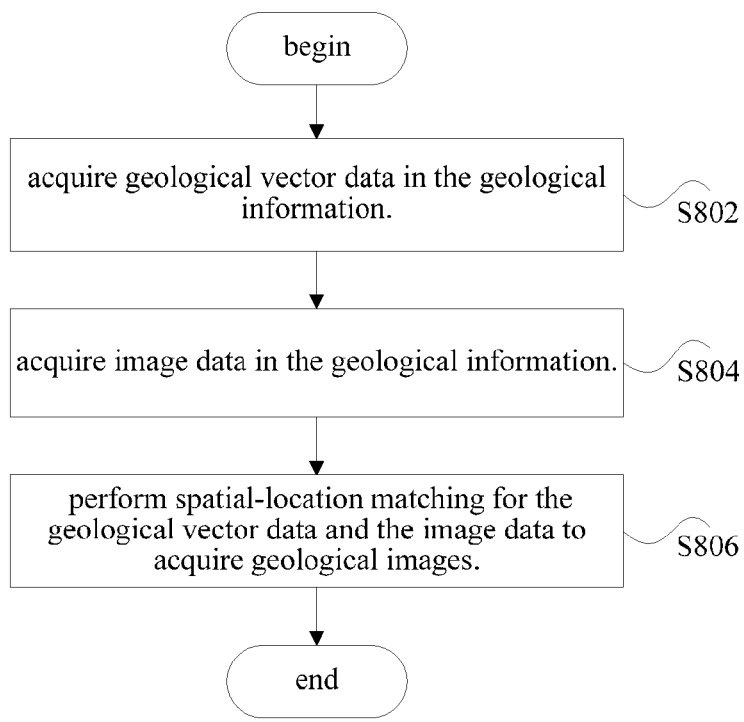
FIG. 11 is a flowchart of a method for processing geological information according to the second embodiment of the present disclosure.

FIG. 11 is a flowchart of a method for processing geological information according to an embodiment of the present disclosure.

As shown in FIG. 11, the method for processing geological information includes:

Step 802: acquire geological vector data in the geological information.

Step 804: acquire image data in the geological information.

Step 806: perform spatial-location matching for the geological vector data and the image data to acquire geological images.

Preferably, after performing the spatial-location matching for the geological vector data and the image data to acquire the geological images, the method further includes: stack the vector data and the geological images to acquire remote sensing data.

Preferably, after stacking the vector data and the geological images to acquire the remote sensing data, the method further includes: correct the geological images, including inclination correction and correction of relief displacement of the geological images.

Preferably, correcting the geological images includes: use a polynomial transformation geometric model to correct the geological images of flat areas and those failing to provide image satellite orbit parameters and sensor parameters, wherein the difference of squares is calculated by more than two redundant control points.

Preferably, correcting the geological images includes: perform physical model correction for the geological images of areas with terribly undulate landforms or large image side views and those applying satellite orbit parameters and sensor parameters of imaging.

Preferably, performing the physical model correction for the geological images includes: recover an imaging model of the geological images; use a DEM to correct the relief displacement according to the imaging model; and use three-dimensional map coordinates or field control point three-dimensional coordinates to perform correction control for the geological images to acquire orthorectified geological images.

Preferably, the method further includes: receive query keywords inputted by a user; and use a search engine algorithm to perform quick retrieval for investigation data based on the keywords.

In order to enhance scientific management of electrical network planning and design, an embodiment of the present disclosure creatively puts forward a "multidimensional space-time electric power engineering geological information model". An "electrical network, geomorphology, geology and time" multidimensional information structure is configured to comprehensively express an electrical network construction geological environment, integrate data including topographic image graphs of the electrical network and ground spaces as well as various underground isograms and structural diagrams and the like according to geographical spatial locations, and couple the data according to design data of each key time node (selection of locations and routes, planning design and construction running) of electric power facilities including substations, overhead lines and cable tunnels etc. to form an original multidimensional space-time electric power facility engineering geological information model to support life cycle management of geological information of electric power facility engineering.

Taking the Beijing Geology Map for example, a "multidimensional space-time electric power engineering geological information model" is constructed based on spatial locations, a large map system including the Beijing Geology Map etc. is scanned according to different partitions by a "method for splicing characteristic point correction partitions", existing coordinates of multiple related electric power projects are selected as a characteristic point group to project corresponding scanning maps in a Beijing electric power geographical information space according to different partitions and layers to improve the superposition precision of raster graphs and geographic spaces. Electrical network distribution is correlated with corresponding geomorphologic and geological space data, and geological and electric power engineering information is managed dynamically using electric power engineering design as an object and planning, preliminary design, installation, running and transformation as time nodes.

Supported by GIS technology, based on acquisition, organization, analysis and integration of existing data, information and achievements, and guided by demands of electrical network planning design services, the present project aims to manage geological information digitally and integrally, and construct a specialized electric power geological information management system by comprehensively using GIS technology, computer network technologies, modern database technologies and system integration technologies. The subject is mainly devoted to integration and secondary development of data and achievements, which is described throughout the whole process of the work based on the principle of "implementing construction, application, services and improvement simultaneously".

Figure 13:
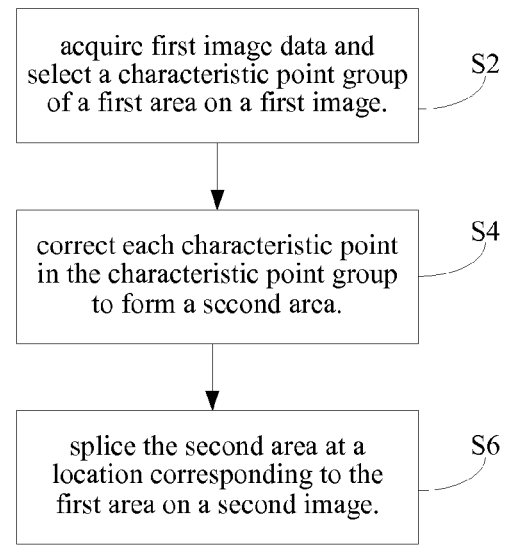
FIG. 13 is a schematic diagram of a specific embodiment of a method for acquiring multidimensional space-time electric power engineering geological information of the present disclosure.
Figure 14:
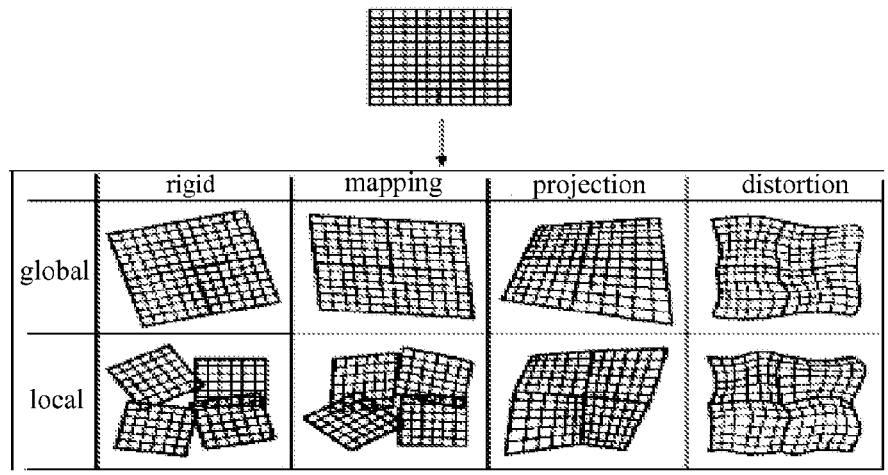
FIG. 14 is a schematic diagram illustrating specific splicing in a method for splicing characteristic point correction partitions according to an embodiment of the present disclosure.

As shown in FIG. 13 and FIG. 14, the method for splicing characteristic point correction partitions according to the embodiments of the present disclosure includes: Step 2: acquire first image data and select a characteristic point group of a first area on a first image; Step 4: correct each characteristic point in the characteristic point group to form a second area; and Step 6: splice the second area at a location corresponding to the first area on a second image.

Through the technical solution of the present embodiment, splicing of characteristic point correction partitions can reduce errors of drawings from hundreds of meters to several meters.

Specifically, the method for splicing characteristic point correction partitions scans a large map system including the Beijing Geology Map etc. according to different partitions, selects existing coordinates of multiple related electric power projects are selected as a characteristic point group to project corresponding scanning maps in a Beijing electric power geographical information space according to different partitions and layers to improve the superposition precision of raster graphs and geographic spaces. Electrical network distribution is correlated with corresponding geomorphologic and geological space data, and geological and electric power engineering information is managed dynamically using electric power engineering design as an object and planning, preliminary design, installation, running and transformation as time nodes.

Preferably, Step 4 includes: Step 41: calculate the minimum mean square error of each characteristic point; and Step 43: correct each characteristic point according to the minimum mean square error;

Optionally, the minimum mean square error in Step 41 is calculated according to the following method: acquire the minimum mean square error of each characteristic point by performing rigid transformation for the base point coordinate of each characteristic point and the minimum mean square error applies the following formula:

$$\min_F E = \min_F \frac{1}{N} \sqrt{\sum_{i=0}^{N} \|y_i - F(x_i)\|^2};$$

where $x_i$ and $y_i$ are the base point coordinates of the characteristic point;

$$\min_F E$$

is the minimum mean square error; $F(x_i)$ is rigid transformation, i.e. the distance between any two points in an image is unchanged before and after the transformation.

The algorithm above is a cost function and applies a traditional method, i.e. the iteration method which requires more registration points with relatively large time consumption.

Preferably, a calculation method of the minimum mean square error in Step 41 is: acquire the minimum mean square error of each characteristic point by performing rotation transformation for the base point coordinate of each characteristic point, and the minimum mean square error applies the following formula:

$$\min_F E = \frac{1}{N} \sum_{i=0}^{N} \|y_i - R(x_i) - T\|^2$$

where $x_i$ and $y_i$ are the base point coordinates of the characteristic point;

$$\min_F E$$

is the minimum mean square error; $R(x_i)$ is rotation transformation, i.e. each point P is enabled to rotate around a fixed point with a fixed angle to become another point P', the transformation caused thereby is called rotation transformation on a plane; T is translation transformation, i.e. the translation amount between images along the x and y directions.

The algorithm above is a least square algorithm based on Singular Value Decomposition (SVD). The algorithm only needs a small number of registration points to rapidly calculate a rotation transformation matrix and a translation vector at the same time. The formula is minimized subsequently to acquire the minimum mean square error.

Through technical solution of the present embodiment, scanning of large-scale drawings can satisfy the precision required by preliminary stages of a project. Since the precision of drawings is affected by the precision of printing devices, archive storage methods, humidity and temperature of scanning sites, and precision of scanning devices, larger graphs will have greater precision deviation. In order to improve the precision and satisfy basic requirements of preliminary work, a characteristic point group of a preset area is corrected and then superposed at a corresponding location.

According to another aspect of the present disclosure, a device for splicing characteristic point correction partitions is provided.

Figure 15:
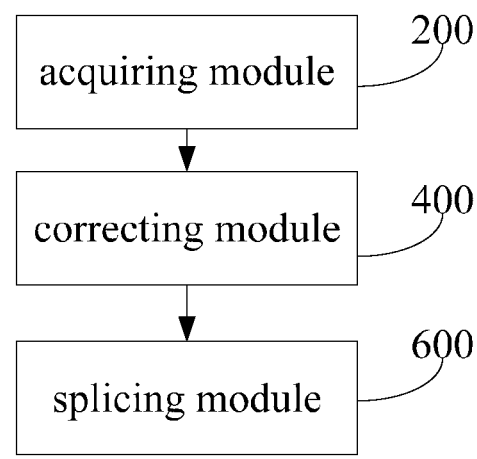
FIG. 15 is a structural diagram of a device for splicing characteristic point correction partitions according to an embodiment of the present disclosure.

As shown in FIG. 15, the device for splicing characteristic point correction partitions includes an acquiring module 200, configured to acquire first image data and select a characteristic point group of a first area on a first image; a correcting module 400, configured to correct each characteristic point in the characteristic point group to form a second area; and a splicing module 600, configured to splice the second area at a location corresponding to the first area on a second image.

Preferably, the correcting module 400 further includes a calculating module, configured to calculate the minimum mean square error of each characteristic point; and a correcting sub-module, configured to correct each characteristic point according to the minimum mean square error.

Preferably, the calculating module includes: a rigid transformation module, configured to acquire the minimum mean square error of each characteristic point by performing rigid transformation for the base point coordinate of each characteristic point.

Preferably, the calculating module includes: a rotation deformation module, configured to acquire the minimum mean square error of each characteristic point by performing rotation transformation for the base point coordinate of each characteristic point.

Preferably, the splicing module 600 includes: a projecting module, configured to project the second area at the location corresponding to the first area on the second image; or a superposing module configured to superpose the second area at the location corresponding to the first area on the second image.

Figure 12:
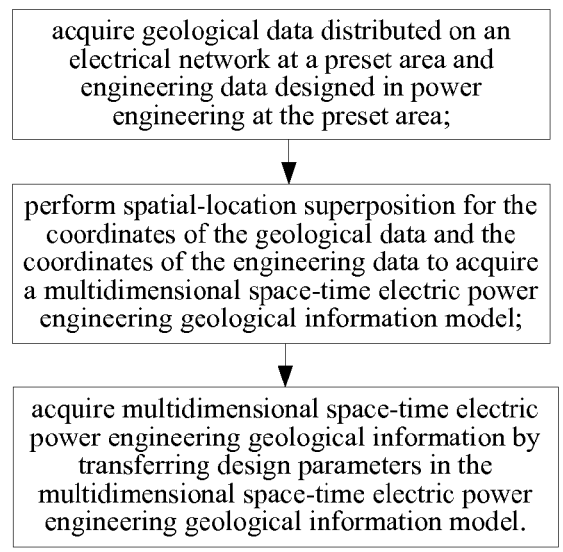
FIG. 12 is a flowchart of a method for acquiring multidimensional space-time electric power engineering geological information according to an embodiment of the present disclosure.

FIG. 12 is a flowchart of a method for acquiring multidimensional space-time electric power engineering geological information according to an embodiment of the present disclosure.

As shown in FIG. 12, the method for acquiring multidimensional space-time electric power engineering geological information includes: acquire geological data distributed on an electrical network at a preset area and engineering data designed in power engineering at the preset area; perform spatial-location superposition for the coordinates of the geological data and the coordinates of the engineering data to acquire a multidimensional space-time electric power engineering geological information model; and acquire multidimensional space-time electric power engineering geological information by transferring design parameters in the multidimensional space-time electric power engineering geological information model. Specifically, in the preset area, electrical network distribution conditions are correlated with topographic, geomorphologic and geological space data of electrical network distribution to describe geomorphologic and geological conditions around electrical network facilities visually according to spatial locations by different partitions, and realize one-stop type acquisition of information including basic engineering geology, hydrological geology, seismic geology and engineering data etc. of engineering field regions and nearby places, e.g. various contents including area stability conditions, formation lithology, conditions of ground water and surface water, site types, earthquake liquefaction, distribution and types of geological hazards, soil resistivity, bearing capacity of foundation etc. Subsequently, a multidimensional information structure is constructed using electric power engineering design as an object and planning, preliminary design, installation running and transformation as time nodes, and geological and electric power engineering information is managed dynamically according to subsequent electric power engineering design.

It can be learned that the information model is beneficial to making decisions for macroscopic control of geological conditions during stages including feasibility study, planned selection of locations and routes, and the like and is favourable to discriminating, screening and entering representative and effective multi-source geological information from a large quantity of sporadic and scattered geological historical data and establishing a two-dimensional database with comprehensive and visual map systems, so that the geological information is clearer in levels, abundant in contents, displayed in a centralized manner and clear at a glance.

Preferably, acquiring the geological data distributed on the electrical network at the preset area and the engineering data designed in the power engineering at the preset area includes: according to spatial locations distributed on the electrical network, acquire topographic, geomorphic and geological space data distributed on the electrical network, wherein the topographic, geomorphic and geological space data distributed on the electrical network includes: information including engineering geology, hydrological geology, seismic geology, engineering data and the like, e.g. various contents including area stability conditions, formation lithology, conditions of ground water and surface water, site types, earthquake liquefaction, distribution and types of geological hazards, soil resistivity, bearing capacity of foundation etc.

Preferably, acquiring the geological data distributed on the electrical network at the preset area and the engineering data designed in the power engineering at the preset area further includes: use electric power engineering design as an object and acquire the time of planning, implementation, running and transformation designed in the electric power engineering, wherein the time of planning, implementation, running and transformation designed in the electric power engineering includes each key time node of electric power facilities including substations, overhead lines and cable tunnels etc.

Preferably, after performing the spatial-location superposition for the coordinates of the geological data and the coordinates of the engineering data to acquire the multidimensional space-time electric power engineering geological information model, the method for acquiring the electric power engineering geological information further includes: according to changes of the geological data and the engineering data, modify the multidimensional space-time electric power engineering geological information model dynamically, i.e. the information including engineering geology, hydrological geology, seismic geology, engineering data and the like, e.g. various contents including area stability conditions, formation lithology, conditions of ground water and surface water, site types, earthquake liquefaction, distribution and types of geological hazards, soil resistivity, bearing capacity of foundation etc., is coupled with each key time node of electric power facilities including substations, overhead lines and cable tunnels etc. in the space to form an original multidimensional space-time electric power facility engineering geological information model to support life cycle management of geological information of electric power facility engineering.

As another embodiment of the present disclosure, a method or device for acquiring multidimensional space-time electric power engineering geological information of the embodiment of the present disclosure may include the following technical solutions.

Firstly, a multidimensional space-time electric power engineering geological information acquisition solution.

First, geological data distributed on an electrical network at a preset area and engineering data designed in power engineering at the preset area are acquired.

Subsequently, spatial-location superposition is performed for the coordinates of the geological data and the coordinates of the engineering data to acquire a multidimensional space-time electric power engineering geological information model and multidimensional space-time electric power engineering geological information is acquired by transferring design parameters in the multidimensional space-time electric power engineering geological information model, wherein acquiring the geological data distributed on the electrical network at the preset area and the engineering data designed in the power engineering at the preset area according to spatial locations distributed in the electrical network mainly includes: acquire topographic, geomorphic and geological space data distributed in the electrical network.

Acquiring the geological data distributed on the electrical network at the preset area and the engineering data designed in the power engineering at the preset area by taking electric power engineering design as an object mainly includes: acquire the time of planning, implementation, running and transformation designed in the electric power engineering.

Finally, after performing the spatial-location superposition for the coordinates of the geological data and the coordinates of the engineering data to acquire the multidimensional space-time electric power engineering geological information model, the multidimensional space-time electric power engineering geological information model is modified dynamically according to changes of the geological data and the engineering data, wherein the present disclosure puts forward and applies "a method for splicing characteristic point correction partitions and layers" for the first time to improve the precision for projecting a raster graph to a geographic space. A large geological map system is scanned for the first time, and existing coordinates of multiple related electric power projects are selected as a characteristic point group to project a corresponding scanning map to an electric power geographic information space according to different partitions and layers, thereby improving the projection precision, and satisfying requirements of preliminary stages of a project. The problem of digital convergence of various kinds of paper drawings which are accumulated over the years and include paper geological maps with different dryness and humidity and different scales at different time can be effectively solved, the paper drawings can be accurately superposed and converged with geological, geographic and grid vector data, and use requirements of stages including planning, designing, construction, running and maintenance etc. on geological information are met, wherein the core of the "method for splicing characteristic point correction partitions and layers" is a "buffer area analysis algorithm based on grids in combination with vectors". At present, popular buffer area analysis algorithms mainly include a "vector-based buffer area analysis algorithm" and a "grid-based buffer area analysis algorithm", wherein the basic idea of the "vector-based buffer area analysis algorithm" is a parallel line method. For a dot-shaped target, it only needs to draw a circle on the dot. For a linear target, two parallel lines are generated at two sides of an axis according to a buffer distance R, and two semicircles are generated at the two ends of the axis. An operation is performed to determine the intersecting part of every two border line segments among all border line segments in all buffer areas and all possible polygons are generated according to intersection determining results. A plane-shaped target is only a special case of linear targets. The advantages of this algorithm are fast speed and small amount of data and the disadvantages include: large amount of calculation, possible abandoning of a large amount of generated polygons, low efficiency, complicated algorithm, numerous correction processes and easily-caused errors.

The basic idea of the "grid-based buffer area analysis algorithm" is a diffusion method. For a dot-shaped target, it only needs to draw a circle on the dot. For a linear target, a data array in which grid data is stored is developed, and all members of the data array are assigned with a value of 0. After a buffer area is generated according to a buffer distance, each grid in the buffer area is assigned with a value of 1, and filled buffer area borders are extracted finally to generate buffer area borders. A plane-shaped target is only a special case of linear targets. The advantages of this algorithm is that the algorithm is simple and easily implemented, and special cases, such as a self-interaction algorithm is easily solved, and the disadvantages include: large data amount, low precision, large buffer area deformation, easily generated "burr" etc. and low graph quality.

The "buffer area analysis algorithm based on grids in combination with vectors" adopts the advantages of the two algorithms above and overcomes their disadvantages to form a more reasonable buffer area analysis algorithm. The basic idea of the buffer area analysis algorithm is that vector data of buffer areas is converted into grid data, and grid buffer area borders are generated by a grid method and then scanned respectively. During the scanning process, vector data of the buffer area borders on the scanning line is extracted, i.e. all necessary line segments that form the final polygons of the buffer areas are extracted. Subsequently, an operation is performed to determine interacting parts of the line segments (multiple buffer areas are intersected or self-intersected). Thus, all mathematical operations are necessary and effective. In addition, the algorithm, which is based on vectors, has relatively accurate results. General steps of the algorithm include: re-sample vector data; then convert the vector data into grid data and store the grid data in a data array; use a grid buffer area analysis algorithm to generate regions of buffer areas subsequently, then scan vector data of grid buffer area borders and perform an operation for determining intersecting parts, and eventually generate the final buffer area borders.

Secondly, a device for acquiring multidimensional space-time electric power engineering geological information, mainly including:

a characteristic point acquiring module, configured to acquire geological data distributed on an electrical network at a preset area and engineering data designed in power engineering at the preset area;

a model superposing module, configured to perform spatial-location superposition for the coordinates of the geological data and the coordinates of the engineering data to acquire a multidimensional space-time electric power engineering geological information model;

an information extracting module, configured to extract design parameters in the multidimensional space-time electric power engineering geological information model. According to a retrieval method based on keywords of geological characteristic points, coordinates (longitude and latitude) and buffer area distances etc., an advanced search engine algorithm is applied to providing combined retrieval based on various conditions, linkage query may be performed with tens of engineering sequences, and a quick retrieval database is maintained locally at the same time to realize a higher recall ratio and a higher precision ratio for the retrieval of investigation data. Therefore, the multidimensional space-time electric power engineering geological information can be extracted rapidly.

A data correcting module configured to, according to changes of the geological data and the engineering data, modify the multidimensional space-time electric power engineering geological information model dynamically.

Compared with the prior art, the embodiment above is favourable for geotechnical engineering technicians to discriminate, screen and enter representative and effective multi-source geological information from a large quantity of sporadic and scattered geological historical data according to actual demands, and construct a two-dimensional database with comprehensive and visual map systems so that the geological information is clearer in levels, abundant in contents, displayed in a centralized manner and clear at a glance.

Figure 5:
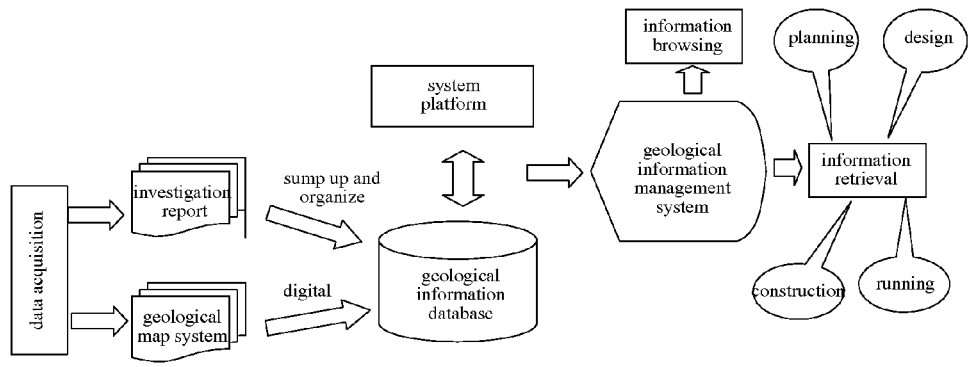
FIG. 5 is a schematic diagram illustrating a processing flow of a geological image according to an embodiment of the present disclosure.

FIG. 5 is a schematic diagram of a specific embodiment of a method for acquiring multidimensional space-time electric power engineering geological information of the present disclosure.

Taking Beijing area for example, the present embodiment sums up acquired data such as investigation reports and geological map systems, digitally enters the acquired data in a geological information library, enters planning, design, construction and running information designed in electric power engineering in a geological information management system, and links the geological information library and the geological information management system by a system platform to provide information browsing and information retrieval services. Through information retrieval, sharing of more accurate data information can be provided for each department/project stages including planning, design, construction and running etc. FIG. 6 is a diagram illustrating a system platform of a method for acquiring multidimensional space-time electric power engineering geological information of the present disclosure, wherein the system of the system platform above generally applies a three-layer architecture system, as shown in FIG. 6, including: a service application layer, an application system platform layer and a basic platform layer.

The basic platform layer includes an attribute database which contains and stores geological information, a GIS database which stores graphic information and a geological digital model library constructed according to basic data and specifically including a geological characteristic point service model, a function integration module and an authority management module.

The application system platform layer includes application service components configured to manage data models and provide services for the service application layer, e.g. a map display component, a printing and output component, a geological modelling component, a statistics and query component, a graphic layer management component, an analysis and calculation component, a characteristic point management component and the like. The application system platform layer further provides services including an interface engine, a configuration engine, a plug-in engine and a buffer engine etc.

The service application layer includes various service functional applications, e.g. management of various geological information, management of formation lithology, management of geological structures, management of seismic activities, space analysis, query statistics, management of design data, printing and outputting, and interface functions etc.

It can be found that the method of the present disclosure is favourable for geotechnical engineering technicians to discriminate, screen and enter representative and effective multi-source geological information from a large quantity of sporadic and scattered geological historical data according to actual needs, and construct a two-dimensional database with comprehensive and visual map systems so that the geological information is clearer in levels, abundant in contents, displayed in a centralized manner and clear at a glance.

A device for acquiring multidimensional space-time electric power engineering geological information of the present disclosure includes an acquiring module, a superposing module and an extracting module, wherein the acquiring module is configured to acquire geological data distributed on an electrical network at a preset area and engineering data designed in power engineering at the preset area; the superposing module is configured to perform spatial-location superposition for the coordinates of the geological data and the coordinates of the engineering data to acquire a multidimensional space-time electric power engineering geological information model; and the extracting module is configured to extract design parameters in the multidimensional space-time electric power engineering geological information model to acquire multidimensional space-time electric power engineering geological information.

Preferably, the device for acquiring multidimensional space-time electric power engineering geological information further includes a modifying module configured to, according to changes of the geological data and the engineering data, modify the multidimensional space-time electric power engineering geological information model dynamically.

It needs to be noted that, any characteristics in different embodiments of the present disclosure may be combined with each other.

It can be learned from the description above that the present disclosure realizes the effect of obtaining large-scale ground images by processing geological images.

Obviously, those skilled in the art should understand that the modules or steps of the present disclosure may be implemented by general computing devices and centralized in a single computing device or distributed in a network consisting of multiple computing devices. Optionally, the modules or steps may be implemented by program codes executable by the computing devices, so that they may be stored in a storage device and executed by the computing device, or they may be respectively made into integrated circuit modules or multiple modules or steps in the modules and steps may be made into a single integrated circuit module. By doing so, the present disclosure is not limited to any specific combination of hardware and software.

The above are only preferred embodiments of the present disclosure and should not be used to limit the present disclosure. For those skilled in the art, the present disclosure may have various modifications and changes. Any modifications, equivalent replacements, improvements and the like within the spirit and principle of the present disclosure shall fall within the scope of protection of the present disclosure.

What is claimed is:

1. A method for processing geological information, comprising:
   acquiring multiple geological image graphs;
   determining the relation between an image coordinate and a ground coordinate of each of the multiple geological image graphs by an imaging mode of geological images; and
   joining the multiple geological image graphs together according to the relation between the image coordinate and the ground coordinate of each of the multiple geological image graphs,
   acquiring first image data and selecting a characteristic point group of a first area on a first image;
   correcting each characteristic point in the characteristic point group to form a second area wherein correcting each characteristic point comprises; and
   splicing the second area at a location corresponding to the first area on a second image, wherein correcting each characteristic point comprises:
    calculating the minimum mean square error of each characteristic point; and
    correcting each characteristic point according to the minimum mean square error,
wherein calculating the minimum mean square error further comprises at least one of:
    acquiring the minimum mean square error of each characteristic point by performing rigid transformation for the base point coordinate of each characteristic point and the minimum mean square error applies the following formula:

$$\min_F E = \min_F \frac{1}{N}\sqrt{\sum_{i=0}^{N} \|y_i - F(x_i)\|^2}$$

where $x_i$ and $y_i$ are the base point coordinates of the characteristic point;

$$\min_F E$$

is the minimum mean square error; $F(x_i)$ is rigid transformation, including the distance between any two points in an image that is unchanged before and after the transformation, or,
    acquiring the minimum mean square error of each characteristic point by performing rotation transformation for the base point coordinate of each characteristic point, and the minimum mean square error applies the following formula:

$$\min_F E = \frac{1}{N}\sum_{i=0}^{N} \|y_i - R(x_i) - T\|^2$$

where $x_i$ and $y_i$ are the base point coordinates of the characteristic point;

$$\min_F E$$

is the minimum mean square error; $R(x_i)$ is rotation transformation including each point P that is enabled to rotate around a fixed point with a fixed angle to become another point P', the transformation caused thereby is indicating a transformation on a plane; and T is translation transformation including the translation amount between images along the x and y directions.

2. The method for processing geological information according to claim 1, wherein
    acquiring the multiple geological image graphs comprises: acquiring multiple geological image graphs of different time;
    joining the multiple geological image graphs together according to the relation between the image coordinate and the ground coordinate of each of the multiple geological image graphs comprises: performing geometric correction for the multiple geological image graphs respectively and joining the multiple geological image graphs which are geometrically corrected together.

3. The method for processing geological information according to claim 2, wherein
    performing the geometric correction for the multiple geological image graphs respectively comprises: acquiring the coordinates of the multiple geological image graphs respectively and correcting the multiple geological image graphs to the same coordinate system according to a data image correction method,
    joining the multiple geological image graphs which are geometrically corrected together comprises: searching mosaic borders of the multiple geological image graphs respectively; determining optimal mosaic borders of the multiple geological image graphs, wherein the optimal mosaic borders are lines between the closest brightness on adjacent geological image graphs; and joining the multiple geological image graphs together according to the optimal mosaic borders of the multiple geological image graphs.

4. The method for processing geological information according to claim 3, wherein after searching the mosaic borders of the multiple geological image graphs respectively, the method further comprises: smoothing the mosaic borders of the multiple geological image graphs respectively; and performing brightness and contrast adjustment for the multiple geological image graphs.

5. The method for processing geological information according to claim 1, wherein the method further comprises:
    acquiring geological vector data in the geological information;
    acquiring image data in the geological information; and
    performing spatial-location matching for the geological vector data and the image data to acquire geological images.

6. The method for processing geological information according to claim 5, wherein after performing the spatial-location matching for the geological vector data and the image data to acquire the geological images, the method further comprises:
    stacking the vector data and the geological images to acquire remote sensing data; and
    correcting the geological images, comprising inclination correction and correction of relief displacement of the geological images.

7. The method for processing geological information according to claim 6, wherein correcting the geological images comprises:
    using a polynomial transformation geometric model to correct the geological images of flat areas or areas failing to provide image satellite orbit parameters and sensor parameters, wherein the difference of squares is calculated by more than two redundant control points;
    performing physical model correction for the geological images of areas with terribly undulate landforms or large image side views and areas applying satellite orbit parameters and sensor parameters of imaging.

8. The method for processing geological information according to claim 7, wherein performing the physical model correction for the geological images comprises:
    recovering an imaging model of the geological images; and
    using a Digital Elevation Model (DEM) to correct the relief displacement according to the imaging model; and
    using three-dimensional map coordinates or field control point three-dimensional coordinates to perform correction control for the geological images to acquire orthorectified geological images.

9. The method for processing geological information according to claim 1, wherein the method further comprises:

receiving query keywords inputted by a user; and
using a search engine algorithm to perform retrieval for investigation data based on the keywords.

10. The method for processing geological information according to claim 1, wherein the method further comprises:
acquiring geological data distributed on an electrical network at a preset area and engineering data designed in power engineering at the preset area;
performing spatial-location superposition for the coordinates of the geological data and the coordinates of the engineering data to acquire a multidimensional space-time electric power engineering geological information model; and
acquiring multidimensional space-time electric power engineering geological information by transferring design parameters in the multidimensional space-time electric power engineering geological information model.

11. The method for processing geological information according to claim 10, wherein
acquiring the geological data distributed on the electrical network at the preset area and the engineering data designed in the power engineering at the preset area comprises: acquiring, according to spatial locations distributed on the electrical network, topographic, geomorphic and geological space data distributed on the electrical network; or using electric power engineering design as an object and respectively acquiring the time of planning, implementation, running and transformation designed in the electric power engineering,
after performing the spatial-location superposition for the coordinates of the geological data and the coordinates of the engineering data to acquire the multidimensional space-time electric power engineering geological information model, the method for acquiring the electric power engineering geological information further comprises: modifying the multidimensional space-time electric power engineering geological information model dynamically according to changes of the geological data and the engineering data.

12. The method according to claim 1, wherein a method for splicing the second area to the second image in comprises:
Projecting the second area at the location corresponding to the first area on the second image; or
Superimposing the second area at the location corresponding to the first area on the second image.

13. A device for processing geological information, wherein it comprises:
an acquiring unit including an electronic computing circuit and an electronic storage device that stores computer readable program that when executed by the computing circuitry is configured to acquire multiple geological image graphs;
a determining unit including an electronic computing circuit and an electronic storage device that stores computer readable program that when executed by the computing circuit is configured to determine the relation between the image coordinate and the ground coordinate of each of the multiple geological image graphs by an imaging mode of geological images; and
a synthesizing unit including an electronic computing circuit and an electronic storage device that stores computer readable program that when executed by the computing circuit is configured to join the multiple geological image graphs together according to the relation between the image coordinate and the ground coordinate of each of the multiple geological image graphs, wherein the device
acquires a first image data and selects a characteristic point group of a first area on a first image;
corrects each characteristic point in the characteristic point group to form a second area, wherein the device corrects each characteristic point comprises; and
splices the second area at a location corresponding to the first area on a second image, wherein the device correcting each characteristic point comprises:
calculating the minimum mean square error of each characteristic point; and correcting each characteristic point according to the minimum mean square error, wherein calculating the minimum mean square error further comprises at least one of: acquiring the minimum mean square error of each characteristic point by performing rigid transformation for the base point coordinate of each characteristic point and the minimum mean square error applies the following formula:

$$\min_F E = \min_F \frac{1}{N} \sqrt{\sum_{i=0}^{N} \|y_i - F(x_i)\|^2}$$

Where in $x_i$ and $y_i$ are the base coordinates of the characteristic point (min E) (over F) is the minimum mean square error; $F(x_i)$ is rigid transformation, including the distance between any two points in an image that is unchanged before and after the transformation or acquiring the minimum mean square error of each characteristic point by performing rotation transformation for the base point coordinate of each characteristic point, and the minimum mean square error applies the following formula:

$$\min_F E = \frac{1}{N} \sum_{i=0}^{N} \|y_i - R(x_i) - T\|^2$$

where $x_i$ and $y_i$ are the base point coordinates of the characteristic point; min E (over F) is the minimum mean square error; $R(x_i)$ is rotation transformation including each point P that is enabled to rotate around a fixed point with a fixed angle to become another point P', the transformation caused thereby is indicating a transformation on a plane; and T is translation transformation including the translation amount between images along the x and y directions.

14. The device for processing geological information according to claim 13, wherein the synthesizing unit comprises:
a correcting module, configured to respectively perform geometric correction for the multiple geological image graphs; and
a synthesizing module configured to join the multiple geometrically-corrected geological image graphs together.

15. The device for processing geological information according to claim 14, wherein the correcting module comprises:
an acquiring sub-module, configured to acquire the coordinates of the multiple geological image graphs respectively; and a correcting sub-module, configured to correct the multiple geological image graphs to the same coordinate system according to a data image correction method.

16. The device for processing geological information according to claim 13, wherein the synthesizing module comprises:
- a searching sub-module, configured to search mosaic borders of the multiple geological image graphs respectively;
- a determining sub-module, configured to determine optimal mosaic borders of the multiple geological image graphs, wherein the optimal mosaic borders are lines between the closest brightness on adjacent geological image graphs; and
- a synthesizing sub-module, configured to join the multiple geological image graphs together according to the optimal mosaic borders of the multiple geological image graphs.

* * * * *